United States Patent [19]

Lindert et al.

[11] Patent Number: 5,116,912

[45] Date of Patent: May 26, 1992

[54] POLYPHENOLIC COMPOUNDS AND USES THEREOF

[75] Inventors: Andreas Lindert, Troy; John R. Pierce, Huntington Woods; David R. McCormic, Madison Heights; William D. Zimmermann, Farmington Hills, all of Mich.

[73] Assignee: Henkel Corporation, Ambler, Pa.

[21] Appl. No.: 710,885

[22] Filed: Jun. 6, 1991

Related U.S. Application Data

[63] Continuation of Ser. No. 128,672, Dec. 4, 1987, Pat. No. 5,039,770.

[51] Int. Cl.⁵ .................. C08C 19/24; C08C 19/20; C08C 19/22
[52] U.S. Cl. .................. 525/340; 525/350; 525/355; 525/374; 525/380
[58] Field of Search ............ 525/340, 350, 355, 374, 525/380; 526/312, 342, 310, 29

[56] References Cited

U.S. PATENT DOCUMENTS 4,517,028  5/1985  Lindert .................. 524/555
4,544,727  10/1985  Ema et al. .................. 526/313

*Primary Examiner*—Joseph L. Schofer
*Assistant Examiner*—N. Sarofim
*Attorney, Agent, or Firm*—Ernest G. Szoke; Wayne C. Jaeschke; Norvell E. Wisdom, Jr.

[57] ABSTRACT

A metal treatment solution comprising an effective amount of a soluble or dispersible compound which is a derivative of a polyphenol. A composition for treatment and after treatment of metal with polyphenol compounds is provided. The present invention includes novel derivatives of polyphenol compounds which are useful in surface treatment solutions or dispersions. A method for using these solutions or dispersions is also provided. The molecular weight of the polyphenols used to form the derivatives of the present invention are in the range of from about 360 to 30,000 or greater. The resulting derivatives of the present invention typically have molecular weight of up to about 2,000,000 with molecular weights within the range of about 700 to about 70,000 being preferred.

20 Claims, No Drawings

POLYPHENOLIC COMPOUNDS AND USES THEREOF

CROSS-REFERENCE TO RELATED APPLICATION

This application is a continuation of Application Ser. No. 128,672 filed Dec. 4, 1987 now U.S. Pat. No. 5,039,770.

BACKGROUND AND SUMMARY OF INVENTION

The present invention relates to the field of protective and/or decorative surface treatment of articles, particularly metals, plastics, and the like.

The present invention comprises novel derivatives of polyphenol compounds useful in the treatment of the surface of metal articles. The present invention also encompasses novel surface treatment solutions or dispersions, and methods of using these solutions or dispersions.

In accordance with the present invention, novel compositions, solutions and dispersions, and methods are provided for use in providing a protective or decorative metal surface treatment; these include the treatment of previously untreated bare metal surfaces, the post-treatment of phosphatized or conversion coated metal surfaces, the application of a paint or other decorative coating or film, and the like. The present invention additionally includes compositions and methods that are particularly useful for treating various metal surfaces including aluminum, steel and zinc metal surfaces. The compositions, solutions and dispersions, and methods of the present invention provide a coating on the metal surface which is effective in enhancing the corrosion resistance and paint adhesion characteristics of the metal surface whether previously conversion coated or not. A further and more detailed understanding of this invention can be obtained from the following disclosure. All parts and percentages are by weight unless otherwise indicated.

The need for applying protective coatings to metal surfaces for improved corrosion resistance and paint adhesion characteristics is well known in the metal finishing art as well as in other metal arts. Traditionally, metal surfaces are treated with chemicals which form a metal phosphate and/or metal oxide conversion coating on the metal surface to improve the corrosion resistance and paint adhesion thereof. The conversion coated metal surfaces are also generally rinsed or post-treated with a solution containing a hexavalent chromium compound for even greater corrosion resistance and paint adhesion.

Because of the toxic nature of hexavalent chromium, expensive wastewater treatment equipment must be employed to remove the residual chromates from plant effluent to comply with environmental regulations and to improve the quality of rivers, streams, and drinking water sources. Hence, although the corrosion resistance and paint adhesion characteristics of conversion coated metal surfaces can be enhanced by an after-treatment solution containing hexavalent chromium, these disadvantages in recent years have lead to much research and development in an effort to uncover effective alternatives to the use of post-treatment solutions containing hexavalent chromium. One alternative to the use of hexavalent chromium involves the use of derivatives of polyphenol compounds such as poly-vinyl phenol. Suitable derivatives and suitable treatment solutions are disclosed in earlier U.S. Pat. Nos. 4,517,028, May 14, 1985; 4,376,000, Mar. 8, 1983 to Lindert; and 4,433,015, Feb. 21, 1984 to Lindert and 4,457,790, Jul. 3, 1984 to Lindert, et al.; all of which are expressly incorporated herein by reference. Also see the two commonly assigned applications entitled "Treatment And After-Treatment of Metal With Carbohydrate-Modified Polyphenol Compounds", U.S. Ser. No. 128,673; and "Treatment and After-Treatment of Metal With Amine Oxide-Containing Polyphenol Compounds", U.S. Ser. No. 128,756; both of which are expressly incorporated herein by reference.

DETAILED DESCRIPTION OF THE INVENTION

In a typical protective metal surface treatment operation employing this invention, the metal to be treated is initially-cleaned by a chemical or physical process and then water rinsed to remove grease and dirt from the surface. The metal surface is then brought into contact with the treatment solution of this invention. Alternatively, and preferably, instead of contacting the metal surface with the treatment solution of this invention immediately following the cleaning process, a conversion coating solution is applied to or otherwise used to pre-treat the metal surface in a conventional manner to form a conversion coating thereon. Then the conversion coated surface is water rinsed and the metal surface is brought into contact with the treatment solutions of the present invention.

Although solutions and/or dispersions of the invention can be effectively applied to treated or untreated metal surfaces, speaking generally the present invention is particularly useful if the metal surface has previously been conversion coated and the invention is accordingly used as a post-treatment; accordingly, as used herein, the term "post-treatment" means the treatment of a metal surface which is not bare metal, and preferably has been previously treated with a conventional conversion coating process. Such conversion coatings are well known and have been described, for example, in *Metal Handbook*, Volume II, 8th Edition, pp. 529–547 of the American Society for Metals and in *Metal Finishing Guidebook and Directory*, pp. 590–603 (1972), the contents of both of which are specifically incorporated by reference herein.

The compositions and processes of the present invention are useful in treating a broad range of metal surfaces, including metals having surfaces that have been conversion coated with suitable conversion coatings such as iron phosphate, manganese phosphate, zinc phosphate, zinc phosphate modified with calcium, nickel, or manganese ions. Examples of suitable metal surfaces include zinc, iron, aluminum and cold-rolled, polished, pickled, and hot-rolled steel and galvanized steel surfaces. As used herein, the term "metal surface" includes both untreated metal surfaces and conversion coated metal surfaces.

The polyphenol compounds of the present inventions are Polymer Materials I, II and III, their salts, and mixtures thereof. The treatment compositions of the present invention comprise an effective amount of a soluble or dispersible treatment compound (Polymer Material) in a carrier that is suitable for surface treatment, i.e., one that allows the selected Polymer Material to be deposited or otherwise placed on the surface of, for example, a metal. The soluble or dispersible compound employed in the present invention is selected from the group consisting of any one of the following Polymer Materials I, II or III (characterized below), solutions or dispersions of these Polymer Materials, their salts, and mixtures thereof. Salts include the acid and alkaline salts thereof.

The methods of the present invention comprise contacting a metal surface with treatment compositions described herein.

Polymer Materials I, II, and III are as follows.

POLYMER MATERIAL I

Polymer Material I comprises a material, preferably a homo- or co-polymer compound, having at least one repeating unit having the formula:

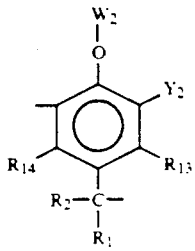

where:
- $R_1$, $R_2$, $R_{13}$ and $R_{14}$ are independently selected for each repeating unit from hydrogen, an alkyl group having from 1 to about 5 carbon atoms, or an aryl group having about 6 to about 18 carbon atoms;
- $Y_2$ is independently selected for each repeating unit from hydrogen, Z, $-CR_{11}R_5OR_6$, $-CH_2Cl$, or an alkyl or aryl group having from 1 to about 18 carbon atoms; preferably at least a fraction of one $Y_2$ is Z;
- Z is

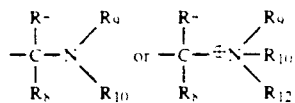

- $R_5$ through $R_{12}$ are independently selected for each repeating unit from hydrogen, alkyl, aryl, hydroxy-alkyl, amino-alkyl, mercapto-alkyl, or phospho-alkyl moiety. Preferably, $R_1$ or $R_7$ through $R_{12}$ are, in total, carbon chain lengths up to that at which the compound is no longer soluble or dispersible in a suitable surface treatment carrier, such as water. $R_{12}$ can also be $-O^{(-1)}$ or $-OH$ (oxygen or hydroxy) in order to form an amine oxide or a hydroxyl amine.
- $W_2$ is independently selected for each repeating unit from the group consisting of hydrogen; acyl; acetyl; benzoyl; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl; 3-alkyloxy-2-hydroxy-propyl; 2-hydroxyoctyl-; 2-hydroxy-alkyl-; 2-hydroxy-2-phenyl ethyl-; 2-hydroxy-2-alkyl phenyl ethyl-isopropenyl- propenyl-; benzyl-; methyl-; ethyl-; propyl-; alkyl; allyl; alkyl benzyl-; haloalkyl-; haloalkenyl; 2-chloro-propenyl-; sodium, potassium; tetra aryl ammonium; tetra alkyl ammonium; tetra alkyl phosphonium; tetra aryl phosphonium; or a condensation product of ethylene oxide, propylene oxide, or a mixture or copolymer thereof.

It will be appreciated that the depiction above represents a repeating unit that characterizes the compound or materials of the present invention; no terminating end units are depicted. The end group not depicted of the polymers of the present invention can be selected by the skilled artisan relying upon art-disclosed techniques. For example, the end groups of the polymer may either be those resulting from the specific polymerization process employed or those intentionally added to alter the polymer characteristics. For example, the end groups may be hydrogen, hydroxyl, initiation fragments, chain transfer agents, disproportionation groups, or other similar methods of terminating a growing polymer chain.

Polymer Material II

Polymer Material II comprises copolymers of alkenylphenols and substituted alkenylphenols co-polymerized with one or more monomers. Preferably the monomers possess an ethylenically unsaturated C=C bond. The alkenylphenolic or substituted alkenylphenolic moieties of the co-polymer compositions have the following structure:

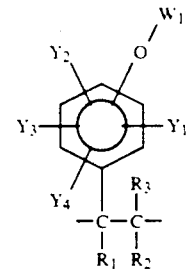

- $R_1$ through $R_3$ are independently selected for each repeating unit from hydrogen, an alkyl group having from 1 to about 5 carbon atoms or an aryl group having from about 6 to about 18 carbon atoms;
- $Y_1$ through $Y_4$ are independently selected for each repeating unit from hydrogen, Z, $-CR_4R_5OR_6$, $-CH_2Cl$, or an alkyl or aryl group having from 1 to 18 carbon atoms; preferably at least a fraction of one of the $Y_1$ through $Y_4$ units is Z.
- Z is

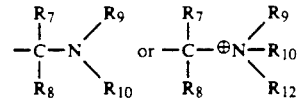

- $R_4$ through $R_{12}$ are independently selected for each repeating unit from hydrogen, an alkyl, aryl, hydroxy-alkyl amino-alky, mercapto-alkyl or phospho-alkyl moiety. Preferably, $R_1$ or $R_4$ through $R_{12}$ are carbon chain lengths up to a length at which the compound is no longer soluble or dispersible in a suitable surface treatment carrier, such as water. $R_{12}$ can also be $-O^{(-1)}$ or $-OH$ in order to form an amine oxide or hydroxyl amine.
- $W_1$ is independently selected for each repeating unit from the group consisting of a hydrogen; an acyl moiety; acetyl; benzoyl; 3-allyloxy-2-hydroxy-propyl-; 3-benzyloxy-2-hydroxy-propyl-; 3-alkylbenzyloxy-2-hydroxy-propyl-; 3-phenoxy-2-hydroxypropyl-; 3-alkylphenoxy-2-hydroxy-propyl-; 3-butoxy-2-hydroxy-propyl-; 3-alkyloxy-2-hydroxy-propyl-; 2-hydroxyoctyl-; 2-hydroxy-alkyl-; 2-hydroxy-2-phenyl-ethyl-; 2-hydroxy-2-alkyl-phenylethyl-; benzyl-; methyl-; ethyl-; propyl-; alkyl; allyl-; alkylbenzyl-; haloalkyl-; or haloalkenyl such as 2-chloro-propenyl-; or a condensation product of ethylene oxide, propylene oxide, or a mixture or copolymer thereof.

Materials having C=C moieties and useful copolymerizable monomer components for use in the present invention can be selected from a variety of unsaturated materials as depicted in the following list. The material may be selected from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl 3methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylmethacrylamide, ethyl methacrylate, ethyl vinyl ether, 5-ethyl-2-vinylpyridine, 5-ethyl-2-vinylpyridine 1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methyloacrylamide, N-methylolamethacrylamide, N-alkoxymethylacrylamide, N-alkoxymethylmethacrylamide, N-butoxymethylmethacrylamide, N-vinyl-caprolactam, methyl acrylate, N-methylmethacrylamide, amethylstyrene, m-methylstyrene, o-methylstyrene, p-methylstyrene, 2-methyl-5-vinylpyridine, n-propyl methacrylate, sodium p-styrenesulfonate, stearly methacrylate, styrene, p-styrenesulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, and N-vinylpyrrolidone. Mixtures of these materials may also be employed.

It is appreciated by those skilled in the art that the alkenylphenolic moieties of the present invention can be either randomly distributed within the co-polymer and terpolymer or can be synthesized to constitute a block orientated polymer, depending upon the methods and conditions used for polymerization.

Preferred final materials are based on a vinyl phenolic moiety or amethyl vinyl phenolic moiety. For example, a vinyl phenol or isopropenylphenol and derivatives thereof may be used.

POLYMER MATERIAL III

Condensate Polymers

By the term "condensation polymers" is meant the following:

A condensation polymer is a material wherein condensable forms (modified to be condensable as noted below) of Polymer Material I, II, or mixtures thereof, are condensed with a second compound selected from the group consisting of phenols (preferably phenol, alkyl phenol, aryl phenol, cresol, resorcinol catechol, pyrogallol) tannins (both hydrolyzable or condensed), novolak resins, lignin compounds, and mixtures thereof, together with an aldehyde, ketone, or mixture thereof, to produce a condensation resin prepolymer product that is a prepolymer of Polymer Material III. The condensable or modified starting materials are modified by initially failing to include the "Z" moiety prior to initiating condensation; an additional modification to make the starting materials condensable will also be appreciated as necessary in that $Y_1$ through $Y_4$ cannot be Z, $-CR_{11}R_5OR_6$, or $-CR_4R_5OR_6$. The "Z" moiety (as described above) is then added later to these condensation prepolymers by again reacting the condensation resin with (1) an aldehyde, ketone, or mixtures thereof, and (2) a secondary amine to produce an adduct which can react with acid and/or can be reacted with hydrogen peroxide to generate an amine oxide and can be used in water or in an organic solvent. If desired the amine oxide can be acid neutralized to form the hydroxyamine.

While this condensation product is described for convenience as being prepared by a sequential reaction, it will be appreciated that these materials can be prepared by carrying out the necessary steps in any order, or simultaneously. However, the sequence described is preferred.

The surface treatment solutions of this invention comprise Polymer Materials I, II, III, or mixtures thereof (with or without the requirement that the Z moiety be present), are preferably dissolved or dispersed in a carrier suitable for depositing or otherwise placing the Polymer Material on the surface of a metal, i.e., as a metal surface treatment, metal surface post treatment, a paint, protective film, or as a component of any of the foregoing.

These Polymer Materials of the present invention may be made soluble or dispersible in water or organic solvent-type carriers. They may therefore be employed as a treatment solution when dissolved in water or in an organic solvent such as, for example, ethanol. Preferably, however, the Polymer Material selected is used in aqueous solution as a carrier.

Accordingly, it is highly desirable to provide or improve the water solubility or water dispersibility of the selected Polymer Material. This is preferably done with an acid used for neutralized and/or complexation of a "Z" moiety thereof (if present). Such acids may be organic or inorganic. Useful and preferred acids for this purpose include carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; these may be employed alone or in combination with each other and may be neutralized by conventional acid-base reactions or by complexing. In a highly preferred embodiment, the addition of water to the neutralized, overneutralized or partially neutralized treatment compounds mentioned above results in a water soluble or dispersible solution or emulsion of the polymer useful for metal treatment.

Alternately, the final Polymer Material/polyphenol compounds of the present invention can be made water soluble or dispersible by neutralization of the phenolic group with an organic or inorganic base. Suitable bases for this purpose include tetra-alkylammonium hydroxides such as tetrabutylammonium hydroxide, tetra arylammonium hydroxide, sodium hydroxide, potassium hydroxide and the like.

In a highly preferred embodiment, the final Polymer Material can be prepared such that the "Z" moiety does not require neutralization, i.e., an amine oxide or the like.

Within such materials, the ratio of any single monomer to any other monomer can be about 1:99 to about 99:1, preferably about 5:1 to about 1:5, and more preferably 1.5:1 to about 1:1.5.

The molecular weight of the polyphenols used in the preparation of derivatives claimed in the present invention can be a dimer, but may preferably be low molecular weight oligomers or resinous polymers having molecular weights in the range of about 360 to about 30,000 or greater. The upper limit molecular weight of materials useful in surface treatment compositions is generally determined by the functional limitation that the derivative therefrom must be soluble or dispersible in the selected carrier. The resulting derivatives of the formulae set forth hereinabove will typically have a molecular weight of up to about 2,000,000 with molecular weights within the range of about 700 to about 70,000 being preferred.

Typically, the pH of the aqueous solution will vary from about 0.5 to about 14. Generally the aqueous solution will have a pH of from about 2.0 to about 12 both for the stability of the solution and for best results on the treated metal surfaces.

It is contemplated that the compositions and treatment solutions of the present invention can be used to treat the surface of a variety of materials, particularly metal and plastic or "plastic-like" surfaces. Preferred metal surfaces include iron-, zinc- and aluminum-based metals. Preferred "plastic-like" material surfaces include resin or polymeric materials, including thermoplastic and thermosetting materials, as well as natural rubbers, mixtures of these materials and the like.

The coating applied may be for protection or decorative in nature, or may be a preparation of the surface for another treatment; it may also serve several functions at once.

The thickness of the final dry or cured coating will depend on its purposes or functions, and may typically range from about 0.0001 mil to about 25 mil or greater. The typical and preferred metal surface treatment (such as conversion-type protective/paint base coating) is in the range of about 0.05 mil and below, and more preferably about 0.0001 mil to about 0.05 mil. When acting as a paint or decorative and protective surface treatment, the resulting coating thickness is about 0.05 mil and above, preferably about 0.05 to about 25 mils, and more preferably about 0.05 to about 10 mil.

It is further contemplated that the treatment compounds of the present invention will generally be used in surface treatment compositions over a wide range of concentrations. It will be appreciated that the levels of use or useful ranges will vary with many factors well-known to the skilled artisan. Useful levels of the compositions of the present invention dissolved or dispersed in a carrier may be in the range of about 0.001% to about 80 percent, depending upon the ultimate use. For example, when used as a pre- or post-treatment of a metal surface, useful levels typically include a dilute to moderate concentration of from about 0.001% to about 20%, by weight, preferably about 0.001% to about 10 percent, by weight, and still more preferably about 0.001% to about 5% by weight. Practically speaking, a concentration of 0.0025 to 1% is preferred in metal surface treatment compositions (especially for iron-, zinc-, or aluminum-based metal surfaces). However, under some circumstances (for example when transporting or storing the solution or when using it in a "dry-in-place" system), a concentrate of the solution may be preferred. Higher levels (for example, as high as 80% by weight) may also be employed when the treatment composition is part of a paint system.

Of course, the treatment solutions of the present invention can also comprise ingredients typically found in other similar treatment compositions, (e.g., conversion coating compositions) in addition to the polymer compound. For example, the treatment solution may optionally comprise an effective amount of a treatment compound according to the present invention, and from about 0.001% to about 3.0% of a metal ion. Metal ions useful for metal treatment in combination with polyphenols of this invention include first row transition metals generally, Group IV-B-metals generally, iron, nickel, cobalt, vanadium, chromium, titanium, zirconium hafnium, scandium, yttrium, lanthanum and their respective Lanthanoid and Actinoid metals, as well as molybdenum and tungsten. In additions, tin, silicon, and aluminum compounds, and in particular their oxides, in combination with the materials of the present invention can be used to improve both the effectiveness or performance of the treatment solution in use. Such materials may also reduce the time of application of treatment solution to the metal surface to as short a time as about 2 to 5 seconds as might be required on a coil coating line. Complex fluoride materials may also be employed. For example, suitable complex fluoride materials include: $BF_4^{(-1)}$, $NH_4HF_2$, hexafluoride and the like.

It must be appreciated that the addition of metal ions may result in the formation of polymer-metal ion chelating compounds.

The Polymer Materials of the present invention may also be employed in surface treatment compositions and surface treatment methods other than those described above. For example, the Polymer Material of the present invention may be employed as a component of a dry-in-place system, a paint system, or as an additive in a system needing a crosslinking agent.

For example, the Polymer Materials of the present invention may be used in a film forming composition that includes a pigment, i.e. may be used as a paint. They may also be employed as an additional component in conjunction with other polymeric materials in a paint system. The Polymer Materials of the present invention are particularly useful in cathodic electrocoat surface treatment compositions. Such protective, functional and/or decorative surface treatment solutions preferably employ typical electrocoat/electrodeposition additives at their art-established levels. The polymer materials of the present invention may be employed as a solubilizing polymer and/or binder in an electro-coat paint. They may be so employed alone or in conjunction with other binder resins. For example, such paint compositions may optionally include pigments (both organic and inorganic); film forming resins, binders such as epoxies, oils, alkyds, acrylics, vinyls, urethanes, phenolics, etc.; and solvents including hydrocarbons, chlorinated aliphatics and aromatics, alcohols, ethers, ketones, esters; nitrated materials; and particulate zinc.

Further, the Mannich derivatives of the present invention when employed with other binders will also act as a crosslinking agent to produce a highly-crosslinked coating upon curing or drying of the film. Accordingly, it may be part of or all of the needed crosslinking agent and binder in the paint system.

Accordingly, the compositions and materials of this invention can be used alone or in conjunction with other resins as polymeric coatings on surfaces. These coatings will crosslink or self-crosslink and can be used in conjunction with other crosslinking agents such as melamine formaldehyde or urea-formaldehyde resins as well as phenolic resins, epoxy resins, isocyanates and blocked isocyanates. The Mannich adducts can also be used to crosslink with vinyl functionality as is present in resins such as diallylmelamine, butadiene, multifunctional acrylic oligomers, unsaturated fatty acids in alkyd resins, fatty acid modified epoxy resins, and the like.

Application of the treatment compositions of the present invention in the treatment step to a metal or other desired surface can be carried out by any conventional method. (While it is contemplated that the metal surface will preferably be a conversion coated metal surface, the treatment step can alternatively be carried out on an otherwise untreated metal surface to improve the corrosion resistance and paint adhesion thereof.)

For example, the treatment composition can be applied by spray coating, roller coating, or dipping. The temperature of the solution applied can vary over a wide range, but is preferably from 70° F. to 160° F. After application of the treatment solution to the metal surface, the surface can optionally be rinsed, although good results can be obtained without rinsing after treatment. Rinsing may be preferred for some end uses, for example, in electrocoat paint application.

Optionally, the treated metal surface is dried. Drying can be carried out by, for example, circulating air or oven drying. While room temperature drying can be employed, the use of elevated temperatures is preferred to decrease the amount of drying time required.

After drying (if desired) the treated metal surface is then ready for painting (with or without the Polymer Materials of the present invention) or the like. Suitable standard paint or other coating application techniques such as brush painting, spray painting, electro-static coating, dipping, roller coating, as well as electrocoating, may be employed. As a result of the treatment step of the present invention, the conversion coated surface has improved paint adhesion and corrosion resistance characteristics.

Further understanding of the present invention can be had from the following illustrative examples. As used herein "salt spray" refers to salt spray corrosion resistance measured in accordance with ASTM-B117-61. As used herein, "Scotch Tape Adhesion" refers to the 180° T-bend adhesion test as described in ASTM-D3794-79. In summary, panels are scribed in the center and subjected to the ASTM tests. The rating tests for corrosion are measurements of the amount of "creeping" the paint does from the scribe in units of 1/16 of an inch. The superscripts represent the number of spots that are present.

EXAMPLE 1

80 g of a resin having an average molecular weight average of about 2400 and wherein $R_1$, $R_{13}$, $R_{14}$ and $W_2$ are H, $R_2$ is $-CH_3$ and $Y_2$ is Z (based on Formula I herein) is slowly dissolved in 160 mls of Propasol P (a propoxylated propanol solvent obtained from Union Carbide Corp., Danbury, Conn.) in a 1 liter resin flask, using a high speed mixer. The resin flask is fitted with a blade stirrer, reflux condenser, and nitrogen purge. The resin solution is then charged with 53.5 mls of 2-(methylamino)-ethanol and 160 mls deionized water. Gentle heating to 60° C. is started. When 60° C. is reached, addition of 50 mls of 37% formaldehyde is begun and continued over a one hour period. An additional 25 mls Propasol P is added and the mixture maintained at 60° C. for 1.5 hours. The temperature is raised to 80° C. and held for 1.75 hours. The reaction mixture is allowed to cool to room temperature and 21.8 g of 75% $H_3PO_4$ followed by 960 mls deionized water is added. Optionally, an amine oxide is formed that does not require the additional neutralization step by adding 0.75 mole of 30% $H_2O_2$ (85 g) to the reaction mixture. The reaction is allowed to stir overnight, and is then diluted with 960 ml of deionized water. The result of this optional step is a water soluble amine oxide resin that does not require neutralization for water stability.

Dilute solutions of the above formulation were applied to phosphated metal at 120° F. for various times by spray application. In a typical metal treatment operation, the metal to be treated is initially cleaned by a mineral spirits wipe, followed by PARCO* CLEANER 338 (Parker Chemical Company) for 60 seconds at 160° F., followed by a hot water rinse for 30 seconds, 60 seconds BONDERITE* 1000 (Parker Chemical Company) treatment at 155° F., 30 seconds cold water rinse, and then the post treatment. Some of the panels were rinsed after post-treatment, others were not rinsed. All panels were then baked in a 350° F. oven for 5 minutes.

The treated panels were painted with Duracron 200 (PPG Industries, Pittsburgh, Pa.) paint. The paint was scribed, and the panels subjected to salt spray accelerated testing for 504 hours and compared to Parcolene 95 and PARCOLENE* 60 controls. Test results for several variations are provided in Table I.

(*-PARCO, BONDERITE and PARCOLENE are registered trademarks of the Parker Chemical Company)

EXAMPLE 2

Reaction of a higher molecular weight version of the resin used in Example 1, ($M_w$ 3800, $M_n$ 1300) with 2-(methylamino) ethanol ("MEA") and formaldehyde following the same cook as for the resin in Example 1.

TABLE I

| | ACCELERATED AND PHYSICAL TESTS | | |
|---|---|---|---|
| Post-Treatment | Concentration/pH | 504 Hrs. Salt Spray | Scotch Tape Adhesion |
| Parcolene 60 Control | —/4.5 | N | 10 |
| Deionized Water | | 6-8 | 10 |
| Resin of Ex. 1 derivative | .1%/pH 6.1 | 0-1$^{2s}$ | — |
| Resin of Ex. 1 derivative | .1%/pH 4.0 | 0-1$^{1s}$ | — |
| Resin of Ex. 2 derivative | .1%/pH 6.1 | 1-2 | 10 |
| Resin of Ex. 2 | .1%/pH 3.8 | 0-1 | 10 |

TABLE I-continued

| | ACCELERATED AND PHYSICAL TESTS | | |
|---|---|---|---|
| Post-Treatment | Concentration/pH | 504 Hrs. Salt Spray | Scotch Tape Adhesion |
| derivative | | | |

EXAMPLE 3

Reaction of vinyl phenol methyl methacrylate co-polymer with methylethanolamine and formaldehyde.

80 g of a poly-4-vinylphenol methyl methacrylate co-polymer (from Maruzen Oil Co. of U.S.A., Inc., New York, N.Y. $M_w$ 14,090 and $M_n$ 6,800, PVP/MMA 57/43 weight ratio) was dissolved in 160 mls Proposal P. 29.2 mls (0.36 equivs) of 99% methylethanolamine is added, followed by 160 mls deionized water. The mixture was brought to 45°-50° C., then 27.3 mls (0.36 equivs) of 37% aqueous formaldehyde was added dropwise over one hour while maintaining the reaction mixture at 45°-50° C. The reaction mixture was then warmed to 80° C. and maintained at this temperature for four (4) hours. After cooling to ambient temperature, 24 g of 75% phosphoric acid and 536 mls deionized water added in portions with good stirring. The resulting solution had a pH of 6.6, and solids content of 13.7%.

The above product was used as a post-treatment for Bonderite 1000 over cold rolled steel 4"×12" test panels in concentrations of 0.05%, 0.1% and 0.90% solids and pH's of 6.1-6.2 and 4.0. Application was via spray tank for 15, 30 and 60 seconds. Partial results are listed below for the Duracron 200 paint system.

| Post-Treatment | Time | 504 Hrs. Salt Spray |
|---|---|---|
| Resin of Example 3 | 15 sec | 1-2 |
| Resin of Example 3 | 60 sec | 1-1 |
| Parcolene 60 | 30 sec | N |
| None | N/A | 2-4 |

EXAMPLE 4

Reaction of a polyvinyl phenol novolak co-polymer with methylethanolamine and formaldehyde ($M_w$ 4,200, $M_n$ 1,330).

80 g of the resin was dissolved in 160 mls Propasol P. 53.5 mls (0.66 equivs) methylethanolamine and 160 mls deionized water was added and the temperature brought to 45°-50° C. Next, 50 mls (0.66 equivs) 37% formaldehyde was added dropwise over one hour. The temperature was maintained between 45° and 50° C. for an additional two (2) hours, heated to 80° C., and maintained at 80° C. for two (2) hours. After cooling to ambient temperature, 21.7 g of 75% phosphoric acid and 993 mls of deionized water was added.

EXAMPLE 5

A polyvinyl phenol-cresol novolak co-polymer ($M_w$ 6,050, $M_n$ 1,600) was reacted in the same proportions with MEA and $CH_2O$ as in Example 4, but had to cook for six (6) hours at 80°-90° C. to reduce formaldehyde concentration to 0.6%. For water solubility, (in 993 mls deionized water), enough 75% phosphoric acid was added to bring pH of reaction product to 3.7. Solids 12.2%.

EXAMPLE 6

A polyvinyl phenol ("PVP") novolak co-polymer ($M_w$ 3,190, $M_n$ 1,120) was reacted in the same manner as in Example 4, except 46 g of 75% phosphoric acid was required to solubilize the product in water (final pH=4.9).

EXAMPLE 7

A PVP-novolak co-polymer ($M_w$ 3,460, $M_n$ 1,170) was reacted in the same manner as in Example 4, except 61 g of 75% phosphoric acid was needed to solubilize the product in water (final pH=5.0).

| Post-Treatment | Time | pH | Salt Spray |
|---|---|---|---|
| 0.1% Example 4 derivative | 30 | 4.1 | 0-1⁵ |
| 0.1% Example 4 derivative | 30 | 6.3 | N |
| PARCOLENE 60 | 30 | 4.0 | N |
| None | — | — | 7-8 |
| 0.1% Example 6 derivative | 30 | 6.0 | 0-1²⁵ |
| 0.1% Example 6 derivative | 60 | 6.0 | 0-1⁶⁵ |
| 0.1% Example 6 derivative | 30 | 4 | 1-3 |
| PARCOLENE 60 | 30 | 4.0 | N |
| None | — | — | 4-6 |
| 0.1% Example 7 derivative | 30 | 6.0 | 0-1⁵ |
| 0.1% Example 7 derivative | 60 | 6.0 | 0-1⁵ |
| 0.1% Example 7 derivative | 30 | 4.1 | 0-1⁵ |
| PARCOLENE 60 | 30 | 4.0 | 0-1⁵ |
| None | — | — | 4-6 |
| 0.05% Example 5 derivative | 30 | 6.2 | 0-1 |
| 0.1% Example 5 derivative | 30 | 6.3 | 1-2³⁵ |
| 0.1% Example 5 derivative | 60 | 6.3 | 0-2 |
| 0.1% Example 5 derivative | 30 | 4.0 | 0-1²⁵ |
| PARCOLENE 60 | 30 | 4.5 | N |
| None | — | — | 5-6⁹⁵ |

EXAMPLE 8

Reaction of a polyvinylphenol resin in which 20% of the phenolic hydrogens have been replaced by 2-hydroxy propyl-1,3,5-trimethylhexanoate with methylethanolamine and formaldehyde.

83 g of the resin was dissolved in 271 g Propasol P, 30 g (0.40 equivs) methylethanolamine was added and the mixture warmed to 60° C. Next, 30 mls (0.40 equivs) of 37% formaldehyde was added over one hour. The temperature was held at 60° C. for an additional hour, then heated to 80° C. for four (4) hours. A formaldehyde titration at this time of the reaction mixture yielded 0.93% formaldehyde. The mixture was warmed to 90° C. and held at 90° C. for six (6) hours. Formaldehyde concentration had dropped to 0.4% by titration. After cooling to ambient temperature, 13 g of 75% phosphoric acid and 600 mls deionized water was added with good stirring. The resulting solution had a pH of 6.8 and solids content of 9.5%.

EXAMPLE 9

A polyvinylphenol resin in which 30% of the phenolic hydrogens have been replaced by 2-hydroxy propyl-1,3,5-trimethylhexanoate was reacted with methylethanolamine and formaldehyde in the same manner as in Example 8, except the ratios of ingredients was changed. Propasol P—300 mls; Resin—94.2 g; 99% methylethanolamine—28.4 mls (0.35 mols); 37% formaldehyde—26.3 mls (0.35 mols). The formaldehyde was added over one hour while maintaining the temperature at 60° C.; the reaction mixture was maintained at 60° C. for an additional hour, heated to 90° C. and maintained for an additional four (4) hours. After cooling, enough 75% phosphoric acid to bring the pH to 5.0 and 600 mls deionized water was added. Solids on the final product was 13.5%.

The above product was used as a post-treatment for BONDERITE 1000 over 4"×12" cold rolled steel panels as described previously. Some test results are listed below:

| Post-Treatment | Time | 504 Hrs. Salt Spray |
|---|---|---|
| Example 8 derivative | 15 s | 0-1<sup>2</sup> |
| Example 8 derivative | 60 s | 0-1<sup>2</sup> |
| PARCOLENE 60 | 30 s | N |
| None | — | 6-7 |
| Example 9 derivative | 15 s | 0-1<sup>3</sup> |
| Example 9 derivative | 60 s | 0-1 |
| PARCOLENE 60 | 30 s | 0-1 |
| None | — | 7-11 |

EXAMPLE 10

Into a one (1) liter reactor equipped with a reflux condensor, nitrogen sparge, thermocouple and additional funnel was added 450 ml of butyl cellosolve (Union Carbide). To the solvent over a 90 minute period was slowly added 180 grams of poly-4-vinylphenol powder (M.W.$_w$ = 5,000) with good agitation. The temperature was then increased to 100° C. to dissolve any resin from the walls of the flask and then 89.25 grams of Araldite DY 025, (Ciba Geigy) a mono-functional epoxide was added followed by the addition of one (1) gram of N,N-Dimethylbenzylamine. The temperature was gradually increased and the reaction mildly exothermed to 167° C. The reaction was post-heated at 175°-185° C. for an additional 3 hours and then cooled. (The final solids of the reaction was 40.3% (baked at 350° F. for 15 minutes) indicating a 99% completion of the reaction.)

The epoxide modified poly-4-vinylphenol derivative from above was used in the preparation of a Mannich derivative as outlined below. 90.13 grams of 2-(N-methylamino)-ethanol was added to the reaction product and solvent above, and the mixture was heated to 50° C. Over a 45 minute period 97.4 grams of a 37% formaldehyde solution was then added and then the reaction was post-heated for the first 2 hours at 50° C. and then 3 hours at 80° C. (The reaction was found to be complete by titration for residual formaldehyde.)

A portion of the above solution was adjusted to a pH of 6.5 with phosphoric acid and diluted to 17% solids with deionized water. Zinc phosphated cold rolled steel panels (Bonderite* EP-1) were dipped into the diluted solution of the above polymer and was electrolytically applied to the cold rolled steel panel using a DC current where the panel was made the cathode and a 316 stainless steel panel was made the anode. The cold rolled steel panels were withdrawn from the treatment bath, rinsed with deionized water and oven baked at 400° F. for 20 minutes. A coating thickness of approximately 0.5 mils was attained. The coating is tested by treatment with methyl ethyl ketone (MEK) and simultaneously rubbed with a cloth, good solvent resistance is obtained.

The above polymer solution in water was also cast on a zinc phosphated cold rolled steel panel (Bonderite* EP-1) by the use of a draw-down bar and then baked at 400° F./20 minutes. Again, good MEK resistance results after the oven-bake, while without an oven curing step less than favorable MEK test results are obtained. These results indicate that the Mannich derivative of the polymer above is self-crosslinking and can be used to form a coating on a metal surface by either casting a film or by cathodic electrodeposition. Good solvent resistance can be obtained without the addition of external crosslinking agents, although substantially similar results may be obtained by adding external crosslinking agents. Such materials may accordingly be applied either electrolytically or non-electrolytically.

EXAMPLE 11

A Mannich adduct of poly-4-vinylphenol with N,N-diallylamine was prepared as above by reacting the following ingredients.
1. 131.2 grams 30.5% poly-4-vinylphenol in Propasol P (supplied by Union Carbide)
2. 27.5 grams of Propasol P
3. 33.4 grams of N,N-diallylamine (supplied by Aldrich Chemical Co)
4. 26.4 grams of a 37.9% formaldehyde solution.

The ingredients were mixed and reacted for approximately five hours at 50° C. and then for 2 hours at 80° C. This reaction was characterized by the consumption disappearance of formaldehyde and the reaction stopped when approximately 99% complete.

The reaction mixture of poly-4-vinylphenol, N, N-diallylamine and formaldehyde from above was diluted to 17.5% solids with solvent (Propasol P) and applied to a cleaned aluminum panel (#3003 alloy) by a conventional non electrolytic method such as spraying. A wet film thickness of 3 mils was obtained; a dry film thickness of approximately 1 mil was attained after baking at 350° C. for ten minutes. MEK (methyl ethyl ketone) solvent resistance of 500+ double rubs was obtained.

The above N, N-diallylamine Mannich adduct of poly-4-vinylphenol produced above in Example 11 was mixed in approximately 10 parts by weight Mannich to 12 parts by weight Monsanto RJ-101 resin (a stryene-allyl alcohol copolymer supplied by Monsanto). This polymeric coating formulation was applied to an aluminum panel using a draw down bar and baked in a convection oven at 350° F. for 10 minutes. No failure of the cured coating was noted after 500+ MEK double rubs.

A coating applied by a convention non-electrolytic method omitting the adduct (employing only the Monsanto RJ-101 Polymer) failed in approximately 10 MEK double rubs. The above results indicate that the compositions of the present invention, whether used alone or in combination with other agents, (i.e. Mannich derivatives of polyvinylphenols) are excellent crosslinking agents for polymeric systems or can be used as polymeric coatings possessing self-crosslinking properties.

What is claimed is:

1. A co-polymer or a condensation product or salt thereof, wherein at least 1 percent of the repeating units in the co-polymer conform to the general formula:

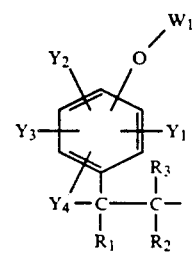

in which $R_1$ through $R_3$ are independently selected for each repeating unit from hydrogen, an alkyl group having from 1 to about 5 carbon atoms, or an aryl group having from about 6 to about 18 carbon atoms; $Y_1$ through $Y_3$ are independently selected for each repeating unit from hydrogen, Z, $-CR_4$, $R_5OR_6$, $-CH_2Cl$, or an alkyl or aryl group having from 1 to 18 carbon atoms; $Y_4$ is Z; and Z conforms to the general formula:

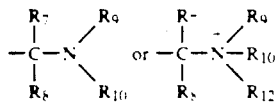

wherein $R_5$ through $R_{12}$ are independently selected for each of such units from hydrogen, or an alkyl, aryl, hydroxy-alkyl, amino-alkyl, mercapto-alkyl or phospho-alkyl moiety; $R_{12}$ may also be selected from $-O^{(-1)}$ or $-OH$; and $W_1$ is independently selected for each repeating unit from the group consisting of hydrogen; an acyl moiety; acetyl; 3-allyloxy-2-hydroxypropyl; 3-benzyloxy-2-hydroxy-propyl; 3-alkylbenzyloxy-2-hydroxy-propyl; 3-phenoxy-2-hydroxy-propyl; 3-alkylphenoxy-2-hydroxy-propyl; 3-butoxy-2-hydroxy-propyl; 3-alkyloxy-2-hydroxy-propyl; 2-hydroxyoctyl; 2-hydroxyalkyl; 2-hydroxy-2-phenyl ethyl; 2-hydroxy-2-alkylphenyl ethyl; benzyl; alkyl; allyl; alkylbenzyl; haloalkyl; haloalkenyl; 2-chloropropenyl; sodium, potassium; tetra aryl ammonium; tetra alkyl ammonium; tetra alkyl phosphonium; tetra aryl phosphonium; or a condensation product of ethylene oxide, propylene oxide, or mixtures thereof;

and said copolymer also contains one or more monomers selected from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostyrene, p-bromostyrene, pyridine, diallyldimethylstyrene, 1,3-butadiene, n-butyl acrylate, tert-butylamino-ethyl methacrylate, n-butyl methacrylate, tert-butyl methacrylate, n-butyl vinyl ether, tert-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylmethacrylamide, ethyl methacrylate, ethyl vinyl ether, 5-ethyl-2-vinylpyridine, 5-ethyl-2-vinylpyridine 1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-alkoxymethylacrylamide, N-alkoxymethylmethacrylamide, N-butoxymethylmethacrylamide, N-vinyl-caprolactam, methyl acrylate, N-methylmethacrylamide, α-methylstyrene, m-methylstyrene, o-methylstyrene, p-methylstyrene, 2-methyl-5-vinylpyridine, n-propyl methacrylate, sodium p-styrenesulfonate, stearyl methacrylate, styrene, p-styrenesulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, N-vinylpyrrolidone, and mixtures thereof; said condensation product of said copolymer compound being made by reacting said copolymer compound with a second compound selected from the group consisting of phenols, tannins, novolak resins, lignin compounds, aldehydes, ketones, and mixtures thereof.

2. A co-polymer or a condensation product or salt thereof of claim 1 that is water soluble or dispersible.

3. A co-polymer or a condensation product or salt thereof of claim 1 which has been neutralized with an acid.

4. A co-polymer or a condensation product or salt thereof of claim 3 wherein the neutralizing acid is carbonic acid.

5. A composition comprising (a) a co-polymer or a condensation product or salt thereof according to claim 1 and (b) a surface treatment carrier having (a) dissolved or dispersed therein.

6. A composition according to claim 5 wherein the carrier comprises water.

7. A composition according to claim 5 wherein the carrier is aqueous and the polymer has been neutralized with an acid.

8. A composition according to claim 7 wherein the acid is carbonic acid.

9. A composition according to claim 7 having a pH of from about 0.5 to about 14.

10. A composition according to claim 9 having a pH of from about 2.0 to about 12.

11. A composition according to claim 5 wherein said co-polymer or a condensation product or salt thereof comprises about 0.001 to about 80% by weight of the final composition.

12. A composition according to claim 11 wherein said co-polymer or a condensation product or salt thereof comprises from about 0.001% to about 10% of said composition.

13. A composition according to claim 12 wherein said co-polymer or a condensation product or salt thereof, comprises from about 0.001 to about 5% of said composition.

14. A composition according to claim 13 wherein said co-polymer or a condensation product or salt thereof comprises from about 0.025% to about 1% of said composition.

15. A composition according to claim 11 wherein said co-polymer or a condensation product or salt thereof comprises from about 1% to about 80% of said composition.

16. A composition according to claim 9 which additionally comprises a complex fluoride material.

17. A composition according to claim 5 which additionally comprises a dissolved or dispersed compound that includes compounds of titanium, zirconium, hafnium, silicon, or mixtures thereof.

18. A composition according to claim 5 which additionally comprises an oxide of silicon, titanium, tin, aluminum, cobalt, nickel, or mixtures thereof.

19. A composition according to claim 1 comprising a condensation product capable of being formed by reaction with a compound selected from the group consisting of phenol, alkylphenols, arylphenols, and mixtures thereof.

20. A composition according to claim 5 which additionally comprises a paint system additive selected from the group consisting of a film forming resin, a pigment, a binder, particulate zinc, or mixtures thereof.

* * * * *